United States Patent
Dailliez et al.

[11] Patent Number: 5,180,462
[45] Date of Patent: Jan. 19, 1993

[54] PAIR OF HOOKS FOR AN APPARATUS FOR THE MANUFACTURE OF A TIRE REINFORCEMENT AND APPARATUS COMPRISING SUCH PAIR OF HOOKS

[75] Inventors: Olivier Dailliez, Chamalieres; Jean-Claude Mayet, Clermont-Ferrand, both of France

[73] Assignee: Sedepro, Paris, France

[21] Appl. No.: 630,522

[22] Filed: Dec. 20, 1990

[30] Foreign Application Priority Data
Dec. 28, 1989 [FR] France .................. 89 17521

[51] Int. Cl.[5] ............................................. B29D 30/10
[52] U.S. Cl. ................... 156/397; 156/117; 156/440
[58] Field of Search .............. 156/397, 117, 439, 440, 156/177, 181; 28/101, 102; 66/84 A

[56] References Cited
U.S. PATENT DOCUMENTS

| | | | |
|---|---|---|---|
| 1,259,997 | 3/1918 | Kline | 156/397 |
| 2,485,396 | 10/1949 | MacCaffray, Jr. | 156/440 |
| 4,277,295 | 7/1981 | Schmidt et al. | |
| 4,801,344 | 1/1989 | Laurent et al. | |

FOREIGN PATENT DOCUMENTS 1291112  4/1963  Fed. Rep. of Germany.
8302749  8/1983  World Int. Prop. O..

Primary Examiner—Geoffrey L. Knable
Attorney, Agent, or Firm—Brumbaugh, Graves, Donohue & Raymond

[57] ABSTRACT

A pair of hooks for the manufacture of a tire reinforcement from a cord in which one of the hooks (32) is articulated relative to the other hook (31). It is designed in such a manner as to permit hooking of a loop of cord on both hooks, to insure grasping of one and only one strand of the loop of the cord by the second hook (32) to maintain the loop open for the insertion of a bead wire, and to optimize the position of the hooks during both the hooking and the unhooking phases.

5 Claims, 2 Drawing Sheets

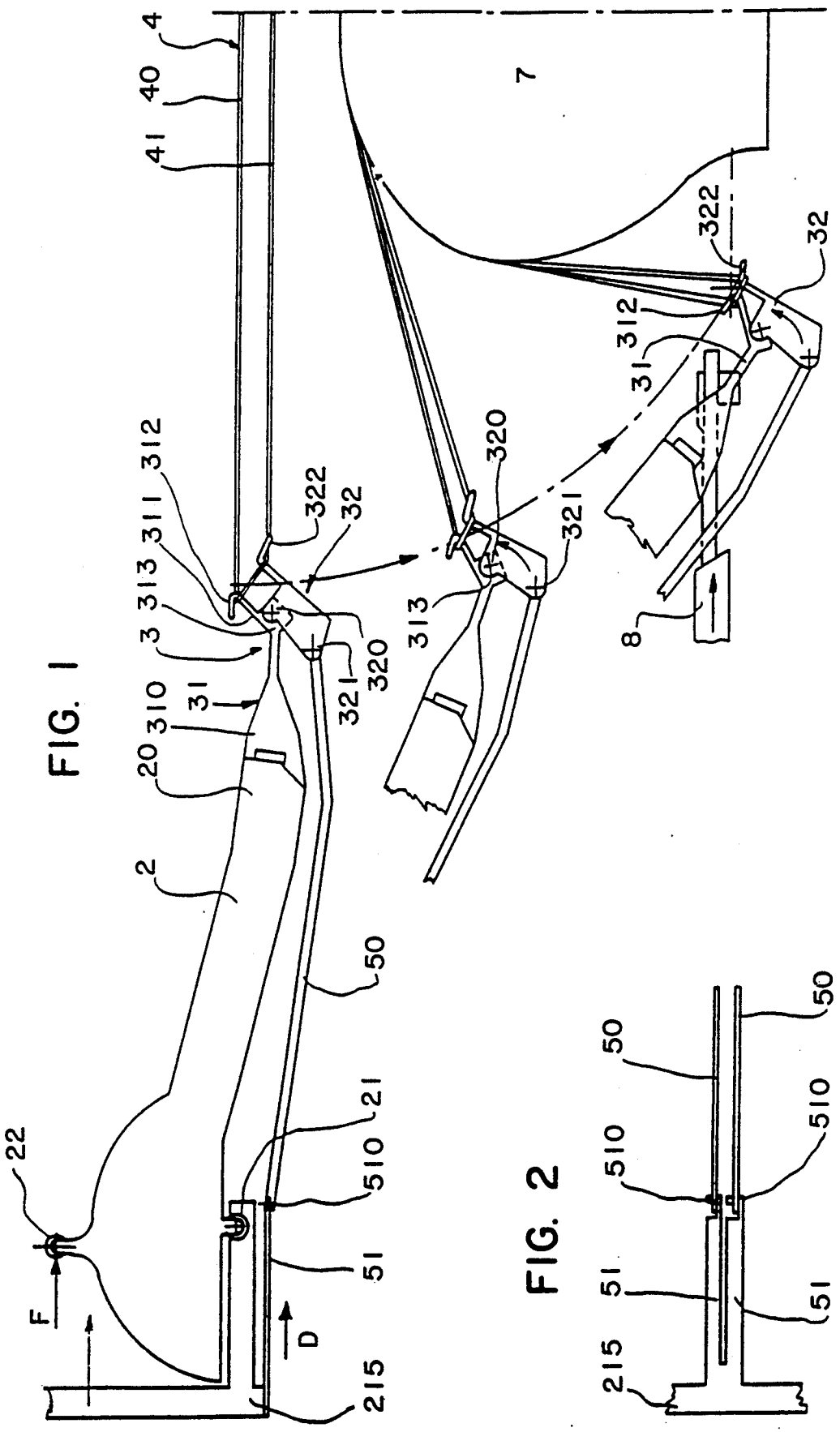

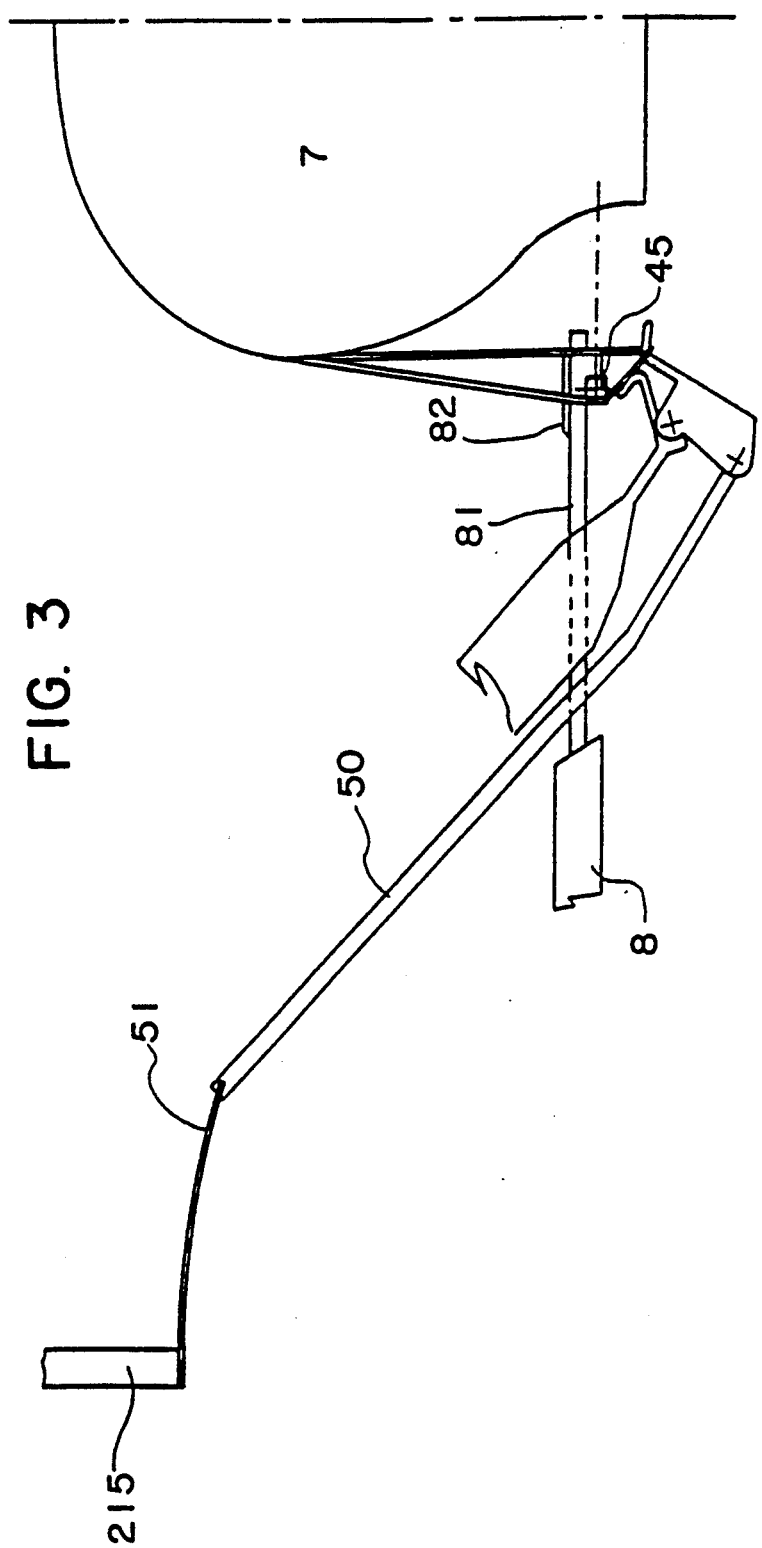

PAIR OF HOOKS FOR AN APPARATUS FOR THE MANUFACTURE OF A TIRE REINFORCEMENT AND APPARATUS COMPRISING SUCH PAIR OF HOOKS

BACKGROUND OF THE INVENTION

The present invention relates to the manufacture of tires, and more particularly, it relates to the type of apparatus described in U.S. Pat. No. 4,801,344, issued Apr. 20, 1987.

This apparatus is used for the manufacture of reinforcements for tires from a single cord and comprises, among its essential parts, cord retaining means borne by levers, referred to in the patent as "support arms," and means for presenting the cord to the retaining means. In the examples described, the cord presenting means embodies a rotary arm which assures the unwinding and hooking of the cord to the retention means. The cord retention means, in turn, embodies a pair of hooks and the unwinding of the cord is assured by dispensing the cord from an orifice which is located at the end of the rotary arm.

In a first stage of manufacture, only the first hook acts to assure the hooking and the retaining of the cord presented by the rotary arm. The position of the second hook is such that each of the two lengths of cord leaving the first hook is arranged on an opposite side of the second hook. It is only upon the lowering of the levers that the point of the second hook engages and retains one of the two lengths of cord in order to move them somewhat apart from each other so as to be able to insert a bead wire through the opening in the loop of the cord.

SUMMARY OF THE INVENTION

The object of the present invention is to provide an improvement in the hooks which assures the cord retention and to make more reliable the action of the second hook in opening the loop for the insertion of the bead wire. Towards this end, it is necessary to provide assurance that the second hook always picks up one and only one strand of the loop of the cord so that the tire produced is always of as good quality as possible. For this purpose, it is proposed that, upon the first stage of manufacture, i.e., hooking of the cord presented by the rotary arm, the hooking of the cord takes place on both of the two hooks of a lever.

In accordance with the invention, the apparatus for the manufacture of a tire reinforcement—the said reinforcement being formed from a single cord and the apparatus being of the type having two coaxial rings of levers, the end of each lever carrying a pair of hooks to retain the cord, and including means for presenting the cord to the hooks, which levers are displaced between a hooking position at which the cord is looped on the hooks and an unhooking position—is characterized by the fact that the first hook is mounted fixed on the lever and the second hook is mounted moveable with respect to the first hook.

In this way, the relative positions of each of the hooks is controlled at each point of the trajectory, in particular at the hooking and unhooking positions, and it is easier to shape and arrange the hooks in order to optimize both the hooking of the cord and the subsequent unhooking of the hooks when the cord is anchored to a bead wire. The loop can be created from the very start, that is to say, upon the hooking of the cord to the hooks, and it is retained for the entire stage of lowering around the core.

The invention also proposes a pair of hooks, one of which is articulated on the other, so as to be able to make one hook moveable with respect to the other.

The invention also proposes a member for controlling the position of the second hooks, employing the swinging of them around a point of articulation which is particularly suitable for the control of the position of the end of the levers operating in the manner explained in said patent.

For an understanding of the structure and principle of operation of the tire reinforcement apparatus in which the present invention is employed, reference should be had to the description thereof in said U.S. Pat. No. 4,801,344 which is hereby incorporated herein by reference.

DESCRIPTION OF THE DRAWINGS

The following figures, viewed in conjunction with the following description, will make it possible better to understand the invention.

FIG. 1 is an elevation view showing a pair of hooks in different stages of the manufacture of a reinforcement;

FIG. 2 is a plan view showing a detail of a member for actuating one of the hooks; and FIG. 3 is a view similar to FIG. 1 illustrating another stage of manufacture.

DESCRIPTION OF PREFERRED EMBODIMENT

The essential members of the apparatus are symmetrical with respect to the plane perpendicular to the axis of rotation and located in the middle of the core 7. FIG. 1 shows only one half of the apparatus. There can be noted therein a lever 2 which tilts around the pivot 21 and bears a pair of hooks 3 at its end 20. The present invention employs the known principle of the folding of the reinforcement on and around the core 7 by simultaneous displacement of all the pivots 21 towards the core combined with rotation of the levers 2 around the pivots 21.

As known from the aforementioned patent, this action is obtained by imposing the displacement D on the pivots 21 while maintaining an adequate thrust F on the push members 22.

The pair 3 of hooks is formed of the hooks 31 and 32. The first hook 31 has a base 310 adapted to be fastened to the end 20 of the lever 2 located closest to the adjacent ring of levers. There is then an offset segment 311 and then a point 312 directed towards the base and inclined with respect to the plane defined by the base and the offset segment 311. The base 310 and the offset segment 311 define a plane corresponding to the plane in which the movement of the end 20 of the lever 2 is inscribed. In FIGS. 1 and 3 this plane corresponds to the plane of the drawing. The point 312, therefore, emerges slightly from the plane of the drawing.

The first hook 31 furthermore has a lug 313 on which the second hook 32 is fastened by an articulation 320. The second hook 32 is provided, on one side of the articulation 320, with a control point 321 in order to determine its position, and on the other side of the articulation 320 with a point 322 directed from the side opposite the base 312 of the first hook 31 and inclined with respect to the same plane as defined above, on the same side as the point 312 of the first hook 31.

The first stage of manufacture of a reinforcement consists in hooking the cord 4 on two circular arrays or rings of hooks. All the remarks contained in the aforementioned patent relative to the presentation of the cord 4 to the pairs of hooks, and their implications with respect to the shape of the hooks and their position and the interchangeable character of the hooks between the right-hand and left-hand rings remain valid. A single characteristic is modified by the present invention, namely, in the phase of the hooking of the cord, the second hook 32 is slightly shifted radially towards a smaller radius with respect to the axis of the core 7 than the first hook 31. More precisely, the hook 32 located axially towards the inside is shifted radially towards a smaller radius than the other hook 31. The purpose is that, upon the hooking of the cord 4 on the hooks upon the unwinding, for instance by the rotary arm described in the aforementioned patent or by equivalent means, the cord 4 rests on each of the two hooks 31 and 32 of each pair 3 of hooks in the two rings of the apparatus.

The hook 32 is controlled in position by a bar 50 which is connected by an articulation to the control point 321 of the hook 32 at one end and, at the other end to a blade 51, also via a point of articulation 510. The axes of each of these articulations, which are located at opposite ends (510 and 321) of the bar 50, and the axis of the articulation 320 of the hook 32 permit movement in the meridian plane. Each bar 50 is arranged substantially parallel to the associated lever 2 in such a manner that the articulation point 510 connecting the bar 50 to the blade 51 is in the vicinity of the pivot 21 of the lever 2. The exact position of this articulation point 510 is determined in such a manner that, taking into account the position of the pivot 21, the articulation 320 and the control point 321, when the lever 2 passes from the hooking position of the cord 4 (upper position in FIG. 1) to the position of insertion of a bead wire and unhooking (position in FIG. 3), the quadrilateral formed by 510, 21, 320 and 321 is deformed substantially in the manner indicated diagrammatically in FIG. 1 by the respective positions of 320 and 321.

There is, therefore, a swinging of the second hook 32 in the trigonometric direction, around the articulation 320, in the case of the left-hand ring of hooks in FIG. 1. The distance between the two hooks 31 and 32 decreases. The angles at the base of the points in which the loop of cord 4 is retained tend to position themselves almost at the same radial level at the end of movement. This means that the length of cord 4 which goes from one hook 31 to the other 32 tends to move parallel to the axis of the core 7.

The most important feature is the following: The position in space of the hooks 31 and 32, in particular the angle with respect to the axis of rotation formed by the points 312 and 322 is favorable for the retention of the cord 4, both in position of hooking and in position of unhooking, while permitting easy unhooking by the intervention of the device 8 used in the insertion of a bead wire 45, in light of what has been explained in the earlier patent, to which reference should be had in order to understand this phase of the manufacture of the reinforcement.

Referring to FIG. 2, it is seen that all the blades 51 are rigidly attached to the plate 215. The plate 215 also bears all the pivots 21. It therefore constitutes the support of the ring of levers 2. The plate 215 constitutes a carrier for the levers and an actuator of the control member of the articulated hooks which has been mentioned above, and at the same time it imposes the axial movement on the pivots 21 (displacement D). As a result, the rotation of the articulated hook 32 is simultaneous with the swinging of the lever 2, which in its turn is permitted due to the push F on the push members 22, causing a rotation of the levers 2 around the pivots 21 when the displacement D is imposed.

The hooking of the cord 4 on the hook 32 causes tensile stresses in the bar 50 and the blade 51. In FIG. 1, it is seen that the blade 51 and the bar 50 are substantially aligned. Therefore, the control member for the position of the articulated hooks assures a rigid positioning of the hooks 32 when the levers 2 are in hooking position, which favors good hooking of the cord 4. Likewise, the design of the hook 31 also makes it sufficiently rigid to the forces caused by the hooking of the cord 4.

On the other hand, as is seen by reference to FIG. 3, in unhooking position, the bar 50 is inclined with respect to the initial orientation of the blade 51. Now the moment of inertia of flexure in a meridian plane of the blade 51 is sufficiently slight for these levers to deform slightly elastically, in particular when the first hooks 31 are unhooked, which corresponds to the stage of manufacture illustrated in FIG. 3.

The device 8 comprises an assembly of rods 81 and fingers 82 which function entirely in the manner explained in the aforesaid patent with respect to the variant concerning the hooks, the points of which are oriented in opposite directions. It is therefore sufficient to refer to it for fuller details.

The apparatus according to the invention is designed in such a manner as to permit the hooking of cord on each pair of hooks, the forward and return motion of the cord to and from each pair of hooks being separated by a space when it is in hooking position (see upper part of FIG. 1). In unhooking position, the apparatus is designed to facilitate the unhooking by the position of the articulated hook on the one hand, and by the elastic flexibility on the other hand.

We claim:

1. Apparatus for the manufacture of a reinforcement for tires, said reinforcement being formed from a single cord, said apparatus having two coaxial rings of levers, each lever having a pair of hooks at its end located closest to the adjacent ring of levers to retain the cord and means for the presentation of the cord to the hooks, the levers being displaceable between a hooking position for hooking of the cord to said pairs of hooks and an unhooking position, characterized by the fact that a first hook of said pair is mounted fixed on the lever and a second hook of said pair is located radially inside the first hook when the levers are in the hooking position and mounted for movement wit respect to the first hook and including a control member for imparting a positive controlled movement to the second hook relative to the first hook with displacement of the lever to the unhooking position.

2. An apparatus according to claim 1, characterized by the fact that said control member assures a rigid positioning of the second hook when said levers are in the hooking position of the cord, and assures a more flexible positioning of the moveable hook in the unhooking position.

3. An apparatus according to claim 1, characterized by the fact that said second hook is articulated with respect to the first hook.

4. An apparatus according to claim 3, characterized by the fact that the control member for positioning the second articulated hook comprises a bar arranged substantially parallel to the lever, articulated at one end on the articulated hook and connected at the other end to the said control member for positioning the articulated hook.

5. In an apparatus for the manufacture of a reinforcement for tires, said reinforcement being formed from a single cord, said apparatus having two coaxial rings of levers (2) with each lever having first and second hooks at its end located closest to the adjacent ring of levers, the levers being displaceable between a hooking position for hooking of the cord to said hooks and an unhooking position, the improvement characterized by the fact that the first hook (31) has a base (310) adapted to be fastened to an end (20) of the lever (2), an offset segment (311) connected to the base, a point (312) connected to the offset segment, directed towards the base and inclined with respect to the plane defined by the base and the offset segment, and by the fact that the first a hook (31) comprises a lug (313) on which the second hook (32) is fastened by an articulation (320), said second hook (32) having on one side of the articulation a point (321) for the control of its position and on the other side of the articulation (320) a point (322) directed from the side opposite said base (310) and inclined with respect to said plane defined by the base and the offset segment (311) on the same side as the point of the first hook, said second hook being located radially inside said first hook when the levers are in the hooking position.

* * * * *